US008506373B2

(12) United States Patent
Stelzer et al.

(10) Patent No.: US 8,506,373 B2
(45) Date of Patent: Aug. 13, 2013

(54) AMUSEMENT DEVICE PRIZE AWARDING SYSTEM AND METHOD

(75) Inventors: James R. Stelzer, Holland, PA (US); Nathan E. Weyer, Trevose, PA (US); Malcolm J. Harwood, Bensalem, PA (US)

(73) Assignee: AMI Entertainment Network, Inc., Bristol, PA (US)

( * ) Notice: Subject to any disclaimer, the term of this patent is extended or adjusted under 35 U.S.C. 154(b) by 850 days.

(21) Appl. No.: 11/381,379

(22) Filed: May 3, 2006

(65) Prior Publication Data

US 2006/0252473 A1 Nov. 9, 2006

Related U.S. Application Data

(60) Provisional application No. 60/677,043, filed on May 3, 2005.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC ...................... 463/9; 463/21; 463/23; 463/25

(58) Field of Classification Search
USPC ........................................................ 463/9, 14
See application file for complete search history.

(56) References Cited

U.S. PATENT DOCUMENTS 4,685,677 A * 8/1987 Demar et al. .................. 463/23
4,856,787 A 8/1989 Itkis
5,200,890 A * 4/1993 Pionchon ........................ 463/11
5,393,061 A 2/1995 Manship et al.
5,511,781 A * 4/1996 Wood et al. .................... 463/13

(Continued)

FOREIGN PATENT DOCUMENTS

DE 3522136 A1 1/1986
DE 4222896 A1 1/1994

(Continued)

OTHER PUBLICATIONS

U.S. Games, Pot-O-Gold, Operational/Technical Manual, 1993-1994 (pp. JVL 000936-00112).

(Continued)

*Primary Examiner* — Michael Cuff
*Assistant Examiner* — Kevin Y Kim
(74) *Attorney, Agent, or Firm* — Panitch Schwarze Belisario & Nadel LLP

(57) ABSTRACT

An amusement device that awards prizes has a display and an input device. The amusement device includes a memory that stores at least one electronic game and a system control program. The at least one electronic game has a plurality of play scenarios and is at least partially skill-based. The amusement device also includes a controller operatively coupled to the memory, the input device and the display. The controller controls the display based upon the system control program retrieved from the memory and based upon inputs from the input device. The controller is configured to permit the user to selectively retrieve from the memory and play the at least one electronic game and determine at least one of an optimum series of requisite moves that will result in an optimal achievable score for a particular play scenario selected from a plurality of play scenarios.

17 Claims, 6 Drawing Sheets

(56) References Cited

U.S. PATENT DOCUMENTS

| | | | | |
|---|---|---|---|---|
| 5,575,717 | A | 11/1996 | Houriet, Jr. et al. | |
| 5,637,844 | A | 6/1997 | Eiba | |
| 5,743,799 | A | 4/1998 | Houriet, Jr. et al. | |
| 5,768,382 | A | 6/1998 | Schneier et al. | |
| 5,779,239 | A * | 7/1998 | Lind | 273/260 |
| 5,779,549 | A | 7/1998 | Walker et al. | |
| 5,816,918 | A | 10/1998 | Kelly et al. | |
| 5,855,516 | A | 1/1999 | Eiba | |
| 5,882,258 | A | 3/1999 | Kelly et al. | |
| 5,917,725 | A | 6/1999 | Thacher et al. | |
| 5,921,864 | A | 7/1999 | Walker et al. | |
| 5,970,143 | A | 10/1999 | Schneier et al. | |
| 5,999,808 | A | 12/1999 | LaDue | |
| 6,039,648 | A | 3/2000 | Guinn et al. | |
| 6,082,887 | A | 7/2000 | Feuer et al. | |
| 6,196,547 | B1 * | 3/2001 | Pascal et al. | 273/292 |
| 6,217,448 | B1 * | 4/2001 | Olsen | 463/25 |
| 6,224,486 | B1 | 5/2001 | Walker et al. | |
| 6,238,288 | B1 | 5/2001 | Walker et al. | |
| 6,240,550 | B1 | 5/2001 | Nathan et al. | |
| 6,287,202 | B1 | 9/2001 | Pascal et al. | |
| 6,343,989 | B1 | 2/2002 | Wood et al. | |
| 6,397,189 | B1 | 5/2002 | Martin et al. | |
| 6,413,161 | B1 * | 7/2002 | Baerlocher et al. | 463/20 |
| 6,537,150 | B1 | 3/2003 | Luciano et al. | |
| 6,645,077 | B2 | 11/2003 | Rowe | |
| 6,921,336 | B1 | 7/2005 | Best | |
| 2001/0000118 | A1 * | 4/2001 | Sines et al. | 273/274 |
| 2002/0019984 | A1 | 2/2002 | Rakib | |
| 2003/0104865 | A1 | 6/2003 | Itkis et al. | |
| 2003/0232640 | A1 * | 12/2003 | Walker et al. | 463/16 |
| 2004/0176162 | A1 | 9/2004 | Rothschild | |
| 2004/0224773 | A1 * | 11/2004 | Sham | 463/42 |
| 2004/0259622 | A1 | 12/2004 | Duhamel | |
| 2005/0183569 | A1 * | 8/2005 | Solomon | 89/1.11 |
| 2005/0197179 | A1 * | 9/2005 | Moshal | 463/13 |

FOREIGN PATENT DOCUMENTS

| | | | |
|---|---|---|---|
| DE | 4402419 | A1 | 8/1995 |
| GB | 2147773 | A | 5/1985 |
| GB | 2184029 | A | 6/1987 |
| GB | 2262642 | A | 6/1993 |
| GB | 2278007 | A | 11/1994 |
| GB | 2371670 | A | 7/2002 |
| GB | 2416713 | A | 2/2006 |
| WO | 9916519 | A1 | 4/1999 |

OTHER PUBLICATIONS

U.S. Games, Super Duper Casino, Mar. 1989.

Merit Industries, Inc., Pit Boss Megatouch Technical Manual, 1995.

* cited by examiner

AMUSEMENT DEVICE PRIZE AWARDING SYSTEM AND METHOD

CROSS REFERENCE TO RELATED APPLICATIONS

This application claims priority to U.S. Provisional Patent Application No. 60/677,043 filed on May 3, 2005 entitled “Amusement Device Prize Awarding System and Method.”

BACKGROUND OF THE INVENTION

The present invention relates generally to an amusement device having an electronic game and method of playing an electronic game, and more particularly, to an amusement device having an electronic game and method of playing an electronic game with a prize awarding system.

Amusement devices having electronic card games such as blackjack and poker variation card games for computers and touchscreen or other types of amusement devices are generally well known in the art. Amusement devices, such as game machines, which allow a user to select games from a video display are well known in the art such as those disclosed in U.S. Pat. No. 4,856,787 (Itkis); U.S. Pat. No. 5,575,717 (Houriet, Jr. et al.); U.S. Pat. No. 5,743,799 (Houriet, Jr. et al.), the contents of which are incorporated by reference herein, each of which shows a touchscreen display for making a game selection from a menu of games. Such game machines or amusement devices typically operate upon input of currency (i.e., coin, token, paper money, credit/debit cards and the like) and are installed in bars, restaurants, airports, shopping malls, video arcades and the like. The game choices may include card games, sports games, games of skill, games of chance, action games, trivia games and the like.

Electronic games such as solitaire, poker, blackjack, pool, and the like for computers and touchscreen or other types of amusement devices are generally well known in the art. Likewise, amusement devices that award prizes or payouts, such as video poker or trivia, are also known in the art. Such prior art prize awarding games are based either on the random odds of the particular deal from a deck of electronic cards or based upon the speed with which a user answers trivia questions correctly. Since it is always possible to get a question right in trivia, such amusement devices control the odds by how much time the player takes to answer the question as opposed to any skill with making particular moves.

New variations of games which are more fast-paced and require the player to strategize in order to win prizes are currently sought after. However, some regulatory agencies (national, state or local) have “gaming” regulations which require that electronic games which award prizes must by capable of awarding a prize or payout for every play or game.

Since most card games (e.g., poker, solitaire and blackjack) and strategy games (e.g., MahJongg) have an apparent “random deal,” the scoring potential may be different for each game play scenario (i.e., each deal of cards or layout of game pieces on a playing area). Thus, such card games and strategy games make it more difficult to control odds and/or guarantee that there is at least one set of moves/actions that will result in winning the maximum prize or payout on a given play scenario (i.e., win the jackpot). Some deals of card games result in poor hands (i.e., game play scenarios) that are simply not winnable no matter what choices the player makes during game play.

It is desirable to provide an amusement device having an electronic game and method of playing an electronic game with a prize awarding system that is at least partially based upon player skill. Further, it is desirable to provide an amusement device configured to award prizes which determines the requisite moves for winning a particular play scenario, such as a particular deal of cards or a particular layout of game pieces. Furthermore, it is desirable to provide an amusement device configured to award prizes for each game play based upon a minimum determinable collection of moves or plays for a given play scenario.

BRIEF SUMMARY OF THE INVENTION

Briefly stated, an embodiment of the present invention comprises an amusement device that awards prizes. The amusement device has a display and an input device. The amusement device includes a memory that stores at least one electronic game and a system control program. The at least one electronic game has a plurality of play scenarios and is at least partially skill-based. The amusement device also includes a controller operatively coupled to the memory, the input device and the display. The controller controls the display based upon the system control program retrieved from the memory and based upon inputs from the input device. The controller is configured to permit the user to selectively retrieve from the memory and play the at least one electronic game and determine at least one of an optimum series of requisite moves that will result in an optimal achievable score for a particular play scenario selected from a plurality of play scenarios.

Another embodiment of the present invention comprises an amusement device that awards prizes. The amusement device has a display and an input device. The amusement device includes a memory that stores a plurality of electronic games and a system control program. Each of the plurality of electronic games has a plurality of play scenarios and is at least partially skill-based. The amusement device also includes a controller operatively coupled to the memory, the input device and the display. The controller controls the display based upon the system control program retrieved from the memory and based upon inputs from the input device. The controller is configured to permit the user to selectively retrieve from the memory and play one of the plurality of electronic games, determine at least one of an optimum series of requisite moves that will result in an optimal achievable score for a particular play scenario selected from a plurality of play scenarios and determine a minimum score necessary to win at least one of a minimum prize/minimum payout and a jackpot.

The present invention also comprises a method for playing an electronic game in an amusement device with the prize awarding system.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Certain terminology is used in the following description for convenience only and should not be construed as limiting. The word “a” as used in the claims and in the corresponding portions of the Specification means “one or more than one.” The word “jackpot” as used herein simply means a “top” or “highest” prize, payout, award, reward or amount.

Figure 1B:
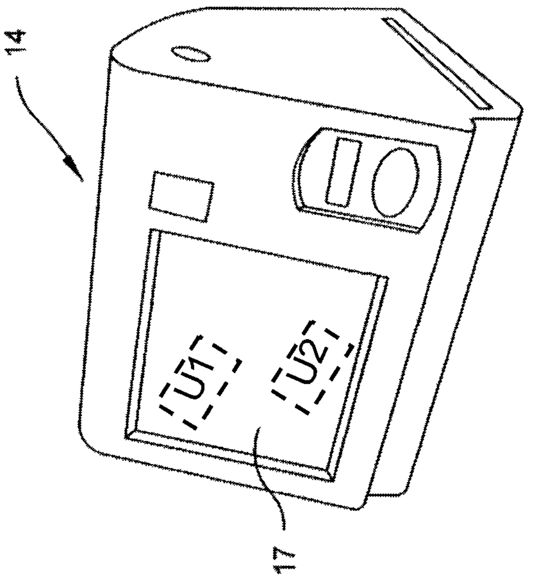
FIG. 1B is a perspective view of a second amusement device having a prize awarding system in accordance with the preferred embodiments of the present invention.
Figure 1A:
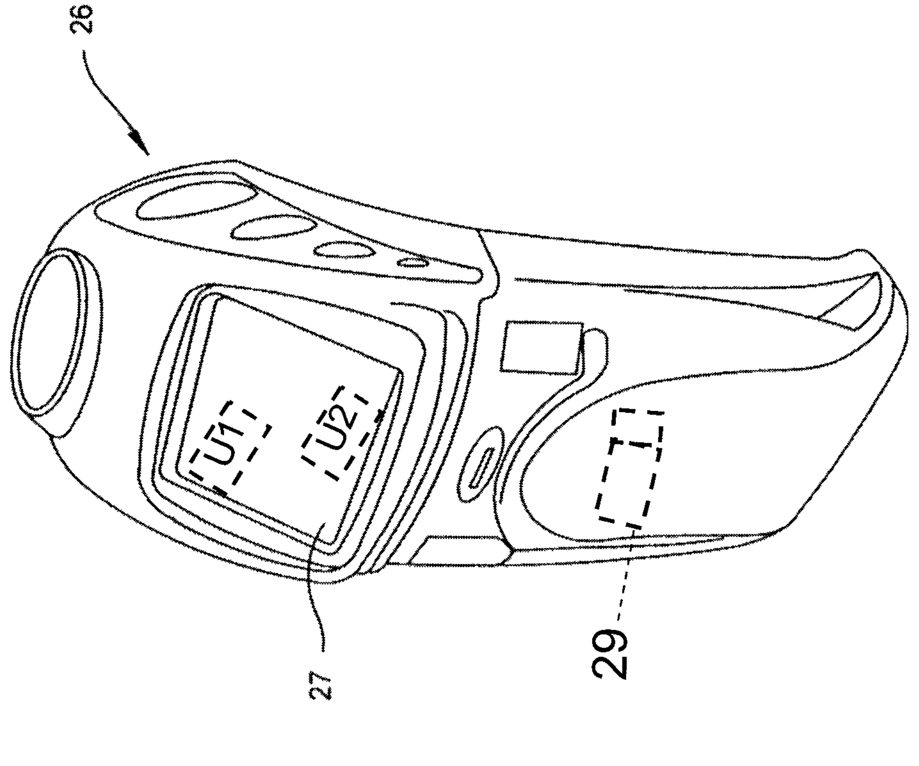
FIG. 1A is a perspective view of a first amusement device having a prize awarding system in accordance with the preferred embodiments of the present invention.
Figure 1C:
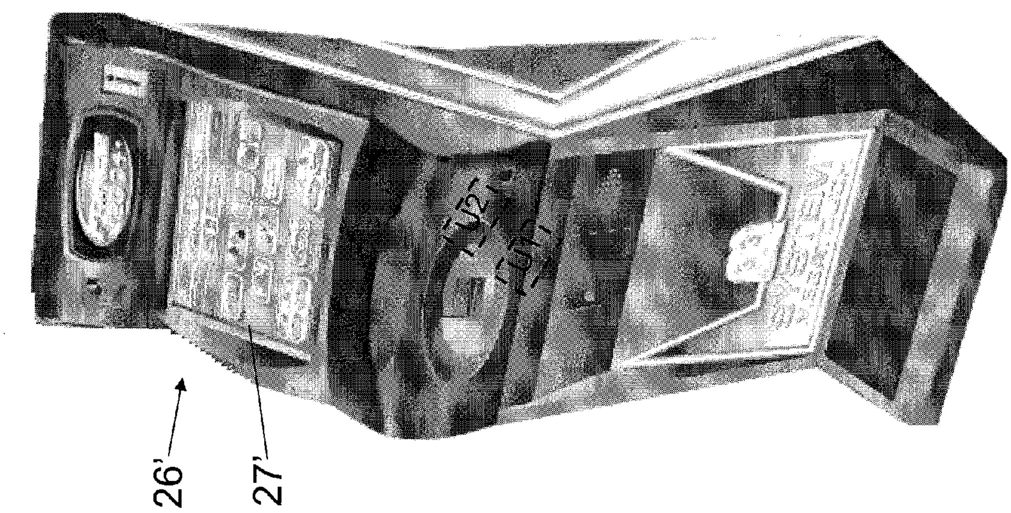
FIG. 1C is a perspective view of an alternate of the first amusement device shown in FIG. 1A having a prize awarding system in accordance with the preferred embodiments of the present invention.
Figure 1D:
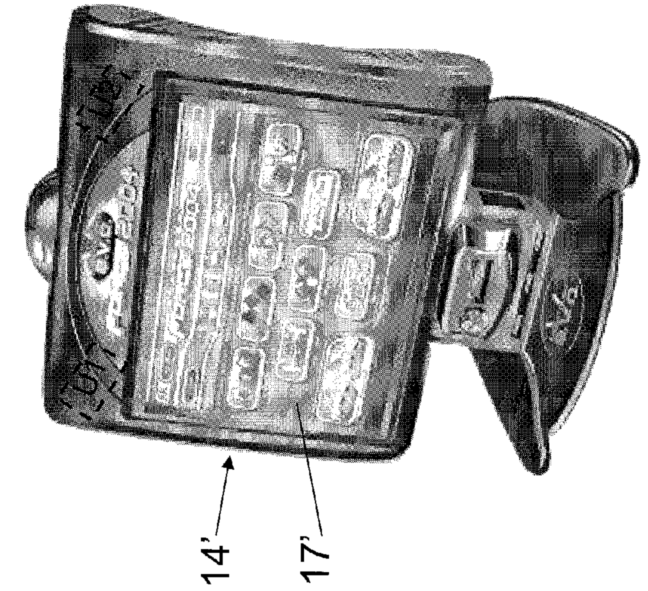
FIG. 1D is a perspective view of an alternate of the second amusement device shown in FIG. 1B having a prize awarding system in accordance with the preferred embodiments of the present invention.

In the drawings, like numerals are used to indicate like elements throughout. Referring to the drawings in detail, FIG. 1A shows a first amusement device 26 having a prize awarding system in accordance with the preferred embodiments of the present invention. The amusement device 26 includes a controller U1 and a memory U2. The amusement device 26 further includes a video display 27 which is operatively connected to the amusement device controller U1. FIG. 1B shows another or second amusement device 14 having a prize awarding system in accordance with the preferred embodiments of the present invention. The second amusement device 14 also includes a controller U1 and a memory U2. The second amusement device 14 also includes a video display 17. Preferably, the video displays 27, 17 are touchscreen video displays configured to accept touch input. The first amusement device 26 is a free-standing or floor-standing apparatus, whereas the second amusement device 14 is a table-top or counter-top apparatus. However, the amusement devices 26, 14 may be arranged in any configuration including table mount, wall mount, pole mount and the like without departing from the invention. FIG. 1C is an alternate amusement device 26' of the first amusement device 26 shown in FIG. 1A having a touchscreen 27', and FIG. 1D is an alternate amusement device 14' of the second amusement device 14 shown in FIG. 1B having a touchscreen 14'.

For convenience, the amusement devices 26, 14, 26' and 14' will be referred to hereinafter simply as “amusement device 26.”

Each amusement device 26 is a stand-alone computer system controlled by the controller or microprocessor U1, the memory U2 and a touchscreen video display driver (not labeled). For purposes of simplicity, the invention will be described with respect to the amusement device 26 throughout the remainder of the description, but it should be noted that the present invention could be implemented with any variety of amusement devices 26 without departing from the spirit of the invention.

The memory U2 stores a plurality of electronic games and a system control program. The controller U1 is operatively coupled to the memory U2, the input device and the display 27 (i.e., the touchscreen display 27). The controller U1 controls the touchscreen display 27 based upon the system control program retrieved from the memory U2 and based upon inputs from the input device in this case the touchscreen display 27. As used herein, the system control program refers to all of the software functions outside of the game or music files including an operating system, display control, input control, sound drivers and the like. Other input devices which may be connected to the amusement devices 26 include a pushbutton(s), a track-ball or touchpad, a mouse, a joy-stick, a foot-pedal, a voice recognition system, a keypad or keyboard and the like. But, preferably, the input device is the touchscreen display 27.

Alternatively, the memory U2 can be configured to run only a single game and the amusement device 26 is then a dedicated amusement device 26 having a prize awarding system. For example, the amusement device 26 may be configured to only play a single type of card game like poker or blackjack without departing from the present invention.

The amusement device 26 may optionally include a communication interface to connect to other amusement devices 26 and/or to a remote server computer in order to permit tournament play and/or remote accounting, remote prize awarding and the like.

The amusement device 26 includes an operating mode and a setup mode. When the operating mode is selected, a player or user is selectively permitted to play electronic games. When the setup mode is selected, the owner/operator is permitted to make system setup adjustments. To switch from the operating mode to the setup mode, a mode selector pushbutton (hardware not shown) is provided that is typically concealed from the users. The mode selector pushbutton may be implemented as a hidden software feature, but preferably the mode selector pushbutton is a simple pushbutton that is disposed inside a housing of the amusement device 26. In the setup mode, the owner/operator may also make adjustments to prize awarding features of the present invention as will be described in greater detail hereinafter.

Each of the plurality of electronic games has a plurality of play scenarios PS1-PSn (Table 1) and is at least partially skill-based. The plurality of electronic games may include solitaire, blackjack, poker, bridge, rummy, war, memory, matching, MahJongg, backgammon, chess, checkers, tic-tac-toe and the like. The plurality of electronic games may include variations of such games as well as other different at least partially skill-based games.

The controller U1 controls the display 27 based upon the system control program retrieved from the memory U2 and based upon inputs from the input device 27. The controller U1 is configured to permit the user to selectively retrieve from the memory U2 and play the one of the plurality of electronic games. The controller U1 either determines an optimal achievable score for a particular play scenario PS1-PSn selected from the plurality of play scenarios PS1-PSn or determines requisite moves for winning a particular play scenario PS1-PSn selected from the plurality of play scenarios PS1-PSn. The controller U1 preferably determine at least one of an optimum series of requisite moves that will result in an optimal achievable score for a particular play scenario selected from a plurality of play scenarios PS1-PSn. If the controller U1 determines the requisite moves, the controller U1 then calculates—using the determined requisite moves for winning a particular play scenario—a score necessary to win at least one of a minimum prize/minimum payout and a jackpot. Thus, the amusement device 26 is configured to award prizes and/or payouts.

The optimal achievable score may be a highest score or a lowest score depending on the goal of the game. For example, in a card game the goal may be to achieve the highest possible score whereas in a golf game the goal may be the lowest possible score.

The awarding of prizes and/or payouts may be physically performed by the amusement device 26 by, for example, dispensing currency or tickets, adding value to a card (e.g., a magnetic stripe or smart card) or may provide a visual indication for an operator to provide such a prize and/or payout. The amusement device 26 may also have a coin hopper 29 (shown in phantom in FIG. 1*a*) for dispensing coins. If the amusement device 26 is connected to a remote server, the prize award may be credited to a user account or may permit the operator to track a user who won from a central location like a payout window or counter. In normal operation, the amusement device 26 will display any credits or points that the player has accumulated or has remaining, the user can then select a payout button or software selection to redeem the credits/points by dispensing coins, money, tickets or crediting an account, card or ticket as mentioned above.

The amusement device 26 determines the requisite moves for winning a particular play scenario PS1-PSn in an electronic game such as a particular deal of cards or a particular layout of game pieces. The amusement device 26 is configured to permit an award of a prize or payout for every game played based upon an optimum, determinable collection of moves or plays for a given play scenario (e.g., the best moves to obtain the best score or result). Thus, every time a player plays, if the player makes all of the right moves/actions, the player must be able to win a prize or payout.

In one embodiment, every time a player plays, if the player makes the right moves/actions, the player must be able to win a maximum prize or maximum payout (e.g., "a jackpot") based at least partially on the player's skills.

Since most card games (e.g., poker, solitaire and blackjack) and strategy games (e.g., matching, memory and MahJongg) have an apparent "random deal," the scoring potential may be different for each game play scenario PS1-PSn (i.e., each deal of cards or layout of game pieces on a playing area). Thus, such at least partially skill-based card games and at least partially skill-based strategy games make it more difficult to control odds and/or guarantee that there is at least one set of moves/actions that will result in winning the maximum prize or payout on a given play scenario (i.e., win the jackpot). Some deals of card games result in poor hands (i.e., game play scenarios PS1-PSn) that are simply not winnable no matter what choices the player makes during game play. However, the present invention includes using a game simulation software tool that records every possible play scenario PS1-PSn, such as every deal of cards for a particular type of card game, "plays" by simulation numerous possible combinations of moves that a player could/might make and then records the best or optimal possible score as determined from the optimum set of moves.

For example, the game simulation software tool may play a single deal of the cards hundreds, thousands or even millions of times. The end result is, even if a hand cards cannot be a "winner" as defined by the game rules, the game simulation software tool determines the best possible score that can be achieved with that particular hand, and therefore, the jackpot can be set to be awarded for a score somewhat less than the score for best possible play for the hand (e.g., at least one point below the highest achievable score). Thus, the determination of the requisite moves for winning a particular play scenario PS1-PSn selected from the plurality of play scenarios PS1-PSn and/or the determination of the optimal achievable score for a particular play scenario PS1-PSn is derived from the game simulation software tool. It should be noted that the optimal score may be the lowest possible score depending on the rules or a particular game which should not be construed as limiting.

The game simulation software tool may be used offline to create a "database" or "lookup table" of optimal possible plays for respective play scenarios and/or of highest achievable scores for respective play scenarios. The database or lookup table is downloaded or otherwise stored in the memory U2 of the amusement device 26. For example, the amusement device 26 may be shipped from the factory with a lookup table of more than 32,000 possible deals and/or play scenarios for each type of card and/or strategy game and the scores associated with a perfect play of each particular game. Thus, the game simulation software tool may be used in a computer (not shown) to generate the lookup table and/or database of requisite moves for winning each particular play scenario PS1-PSn or highest achievable scores for each particular play scenario PS1-PSn. The lookup table or database is then stored in the memory U2 of the amusement device and accessed by the controller to determine the requisite moves for winning a particular play scenario PS1-PSn as the particular play scenario PS1-PSn is generated by the computer. The lookup table or database may simply include the optimal scores for each play scenario PS1-PSn for simplicity. Table 1 shows a basic lookup table or database which may include more or less fields or records.

TABLE 1

| Scenario | optimal achievable score | jackpot minimum/maximum score | minimum prize minimum/maximum score |
|---|---|---|---|
| PS1 | 20,000 | 19,800 | 14,000 |
| PS2 | 100,000 | 99,000 | 70,000 |
| PS3 | 50,000 | 45,000 | 25,000 |
| PSn | X K | (X K * jackpot factor) or (X K +/− jackpot offset) | (X K * minimum-prize factor) or (X K +/− minimum-prize offset) |

Table 1 shows that for play scenario PSn, the minimum/maximum score for a jackpot can be based on a percentage of the best possible score XK (e.g., "XK*jackpot factor") or an offset from the best possible score (e.g., "XK+/−jackpot offset"). Likewise, the minimum/maximum score for a minimum prize/payout can also be based on a percentage of the best possible score (e.g., "XK*minimum-prize factor") or an offset from the best possible score (e.g., "XK+/−minimum-prize offset").

Alternatively, the game simulation software tool itself may be stored in the memory U2 and executed by the controller U1 to determine the requisite moves for winning a particular play scenario PS1-PSn as the particular play scenario PS1-PSn is generated by the controller U1 for play by the user. The controller U1 can then calculate the highest achievable score for a particular play scenario PS1-PSn during use. Thus, the calculations are continuously performed in a particular amusement device 26. The only limitation, of course, would be the speed of the controller U1 and potentially the size of the memory U2.

In order to control the odds of the amusement device 26, just before each game play scenario PS1-PSn, the prize awarding system within the amusement device 26 looks up, calculates or determines an optimal achievable score, which may be for example a highest score for cards or a lowest score for golf, for the game play scenario PS1-PSn about to be presented to the player and the current payout percentage of the particular amusement device 26 then adjusts a winning score to be closer to or further away from the best possible score to get the desired payout percentage as selected by the operator in the setup mode.

Additionally, the prize awarding system within the amusement device 26 adjusts the range of scores necessary to win a prize/payout. Table 2 shows an example of a target payout percentage, the best possible score, the score necessary for award of the jackpot and the minimum score necessary for an award of any prize/payout.

TABLE 2

| 35% Target Payout (operator adjustable) | |
|---|---|
| 100,000 | Best possible score |
| 99,000 | jackpot minimum score |
| 80,000 | minimum possible win score |

If the amusement device 26 is paying out too infrequently, for example only 20% of the time, but the amusement device 26 is paying out enough jackpots compared to the minimum prize/payout winners (e.g., $1.00 winners), the amusement device 26 can be configured to adjust the payout table automatically. For example, the controller U1 may use a setup parameter, such as a percentage of payouts based on a total number of plays of the amusement device 26, to adjust the jackpot minimum score and/or the minimum possible win score to other values like those depicted in Table 2.

TABLE 3

| | |
|---|---|
| 100,000 | Best possible score (determined) |
| 99,000 | jackpot minimum score |
| 70,000 | minimum possible win score |

The payout table can therefore be adjusted by an algorithm or math formula since every play scenario PS1-PSn or deal has a different best possible score. The minimum score for a jackpot can be based on a percentage of the best possible score (e.g., 99%) or an offset from the best possible score (e.g., "best possible score"+/−fixed value amount). Likewise, the minimum score for a minimum prize/payout can also be based on a percentage of the best possible score (e.g., 70%) or an offset from the best possible score (e.g., "best possible score"±fixed value amount).

Either calculation can also be "adjusted" based upon other factors such as the number of times the particular amusement device 26 is actually awarding a prize/paying out. For instance, an operator may enter a desired percentage of jackpots and a desired percentage of other prizes/payouts based on a total number of plays of the amusement device 26.

Alternatively, the payout levels/ranges can be manually entered by the operator as desired such as after reviewing accounting and/or bookkeeping statistics captured at the amusement device 26 and/or at the remote server.

Additionally, the operator can also manually adjust the jackpot offset, the minimum-prize offset, the jackpot factor and the minimum-prize factor, in lieu of allowing automatic adjustments based upon payout.

The amusement device 26 may be configured to permit award of a prize for each game play based upon a optimum determinable collection of moves for the particular play scenario PS1-PSn. The amusement device 26 may be configured to permit award of a jackpot for each game play based upon a minimum determinable collection of moves for the particular play scenario PS1-PSn.

The present invention also includes a method of playing the amusement device 26 as described above. The method includes selectively retrieving from the memory U2 the at least one electronic game, permitting a user to selectively play the at least one electronic game, and determining one of requisite moves for winning a particular play scenario PS1-PSn selected from the plurality of play scenarios PS1-PSn and an optimal achievable score for a particular play scenario PS1-PSn selected from the plurality of play scenarios PS1-PSn. The at least one electronic game has a plurality of play scenarios PS1-PSn and is at least partially skill-based.

The method may also include determining a minimum score necessary to win one of a minimum prize/minimum payout and a jackpot. The method may also include displaying on the display the minimum score necessary to win one of a minimum prize and minimum payout. The method may also include determining a plurality of minimum scores necessary to win each of a plurality of respective prizes/payouts.

Figure 2:
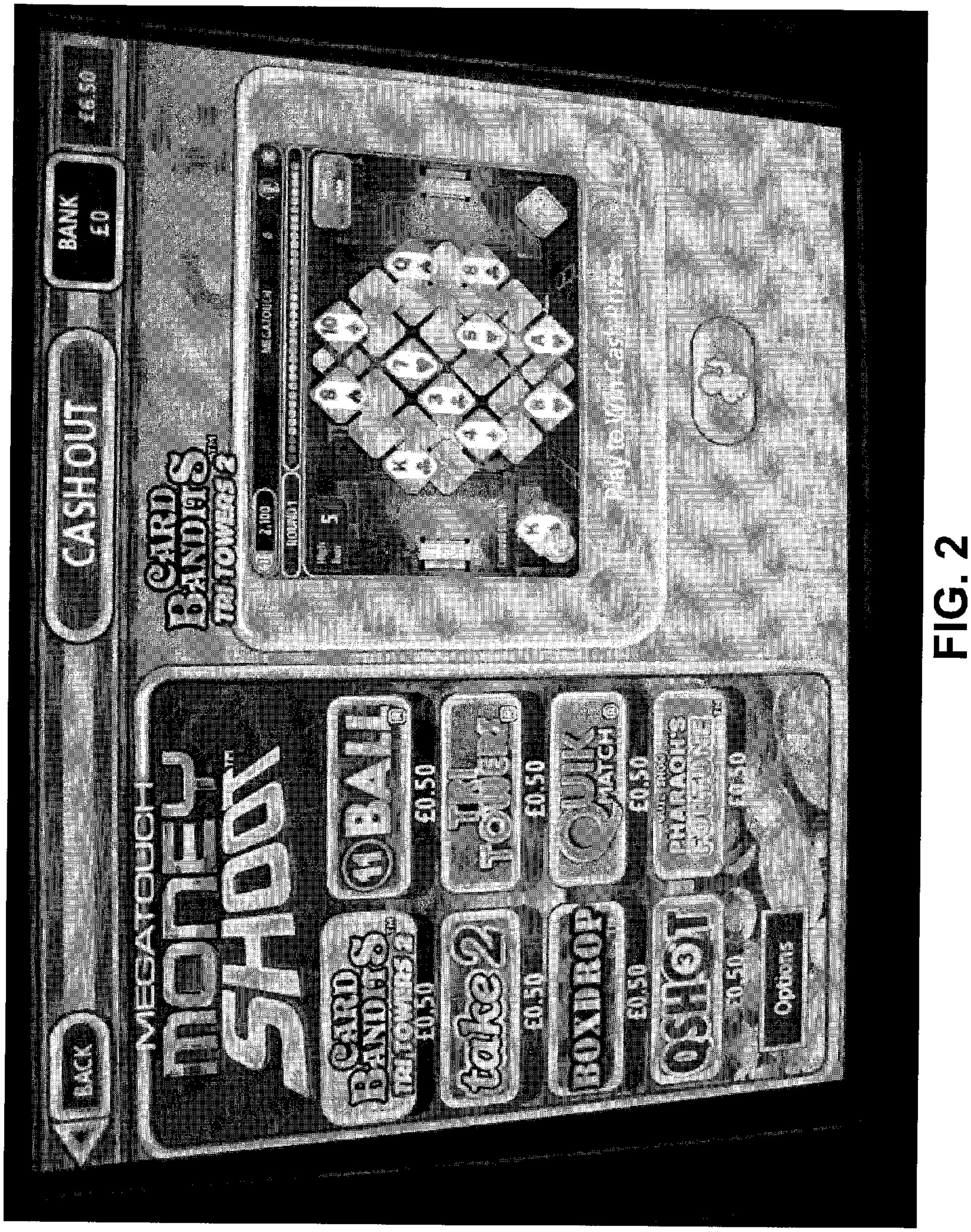
FIG. 2 is a screenshot of an electronic variation card game playable in the amusement devices of FIGS. 1A-1D utilizing the prize awarding system in accordance with the preferred embodiments.

FIG. 2 is a screenshot of an electronic variation card game playable in the amusement devices of FIGS. 1A-1D utilizing the prize awarding system in accordance with the preferred embodiments. In the particular game shown, a variation of reverse solitaire where the cards are disposed in overlying relationship, the goal is to remove all of the playing cards from the playing area by selecting cards having a face value one higher or one lower than the last card showing in a discard pile. However, not every deal of the cards will result in a game that can be won by the rules of the game. Sometimes, even if the player makes all of the best moves, all of the cards can still not be removed. Therefore, the prize awarding system is used to determine the highest point score that could be achieved for removing the most cards from the playing area in order to determine a number of points required to win a jackpot even though the player did not technically "win" the hand based upon the variation reverse solitaire rules.

Figure 3:
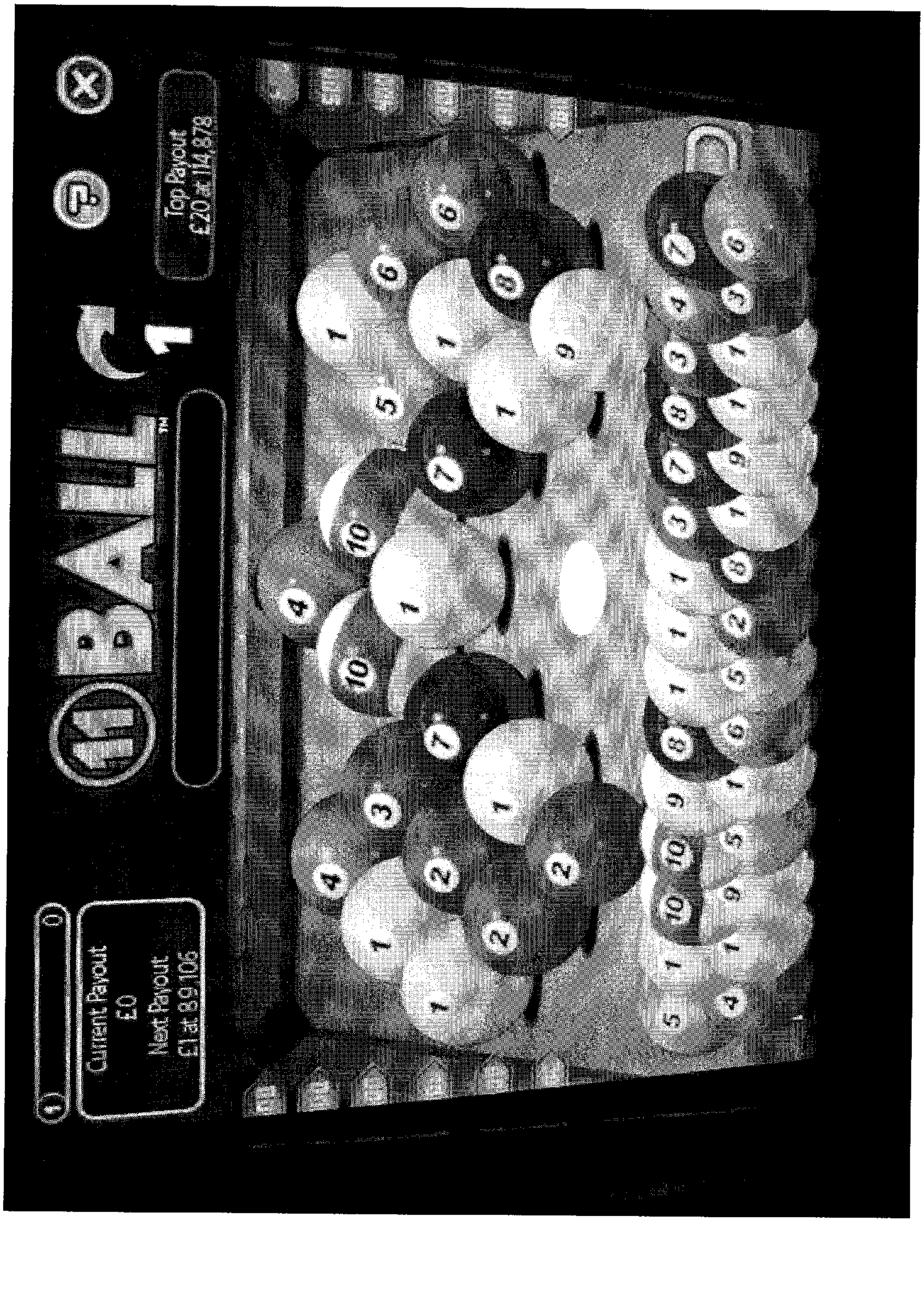
FIG. 3 is a screenshot of an electronic matching game playable in the amusement devices of FIGS. 1A-1D utilizing the prize awarding system in accordance with the preferred embodiments.
Figure 4:
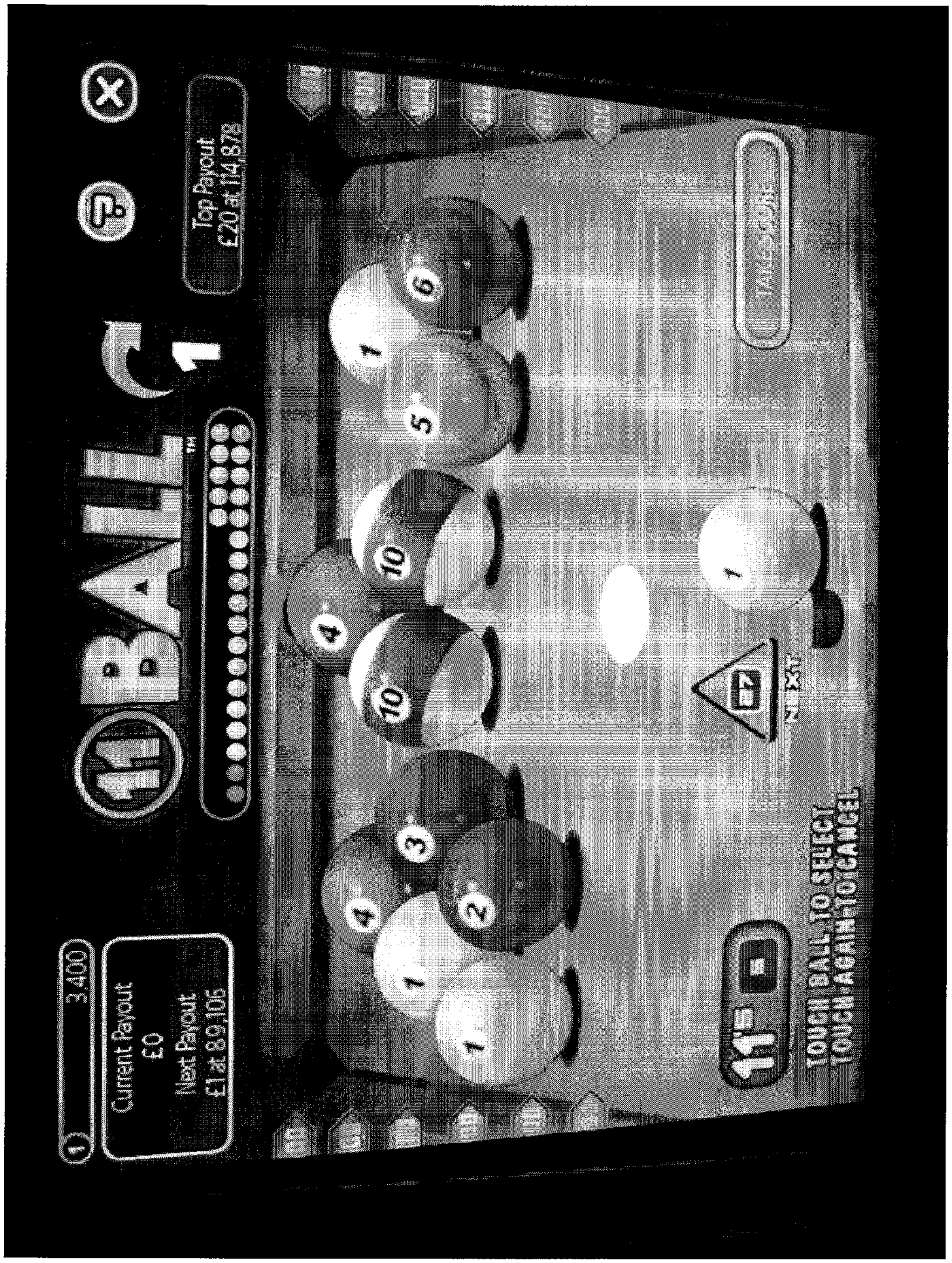
FIG. 4 is a is a screenshot of the electronic matching game of FIG. 3.
Figure 5:
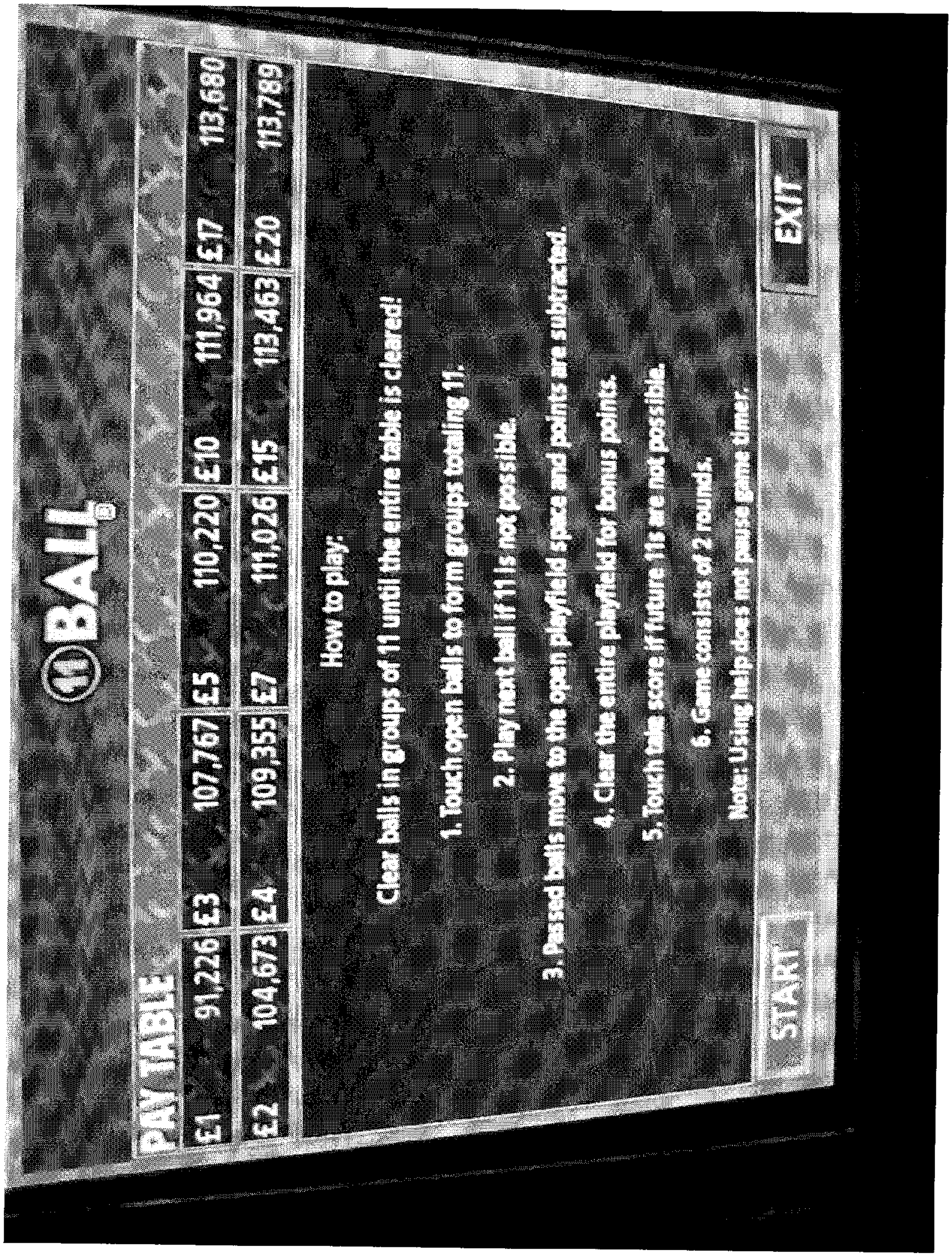
FIG. 5 is a screenshot of instructions for the electronic matching game of FIG. 3 showing a payout table for the particular game being played.

FIGS. 3-5 are screenshots of an electronic matching game playable in the amusement devices of FIGS. 1A-1D utilizing the prize awarding system in accordance with the preferred embodiments. FIG. 5 is a screenshot of instructions for the electronic matching game of FIG. 3 showing a payout table for the particular game being played. The goal of the matching game is to select pairs of similar colored/numbered balls that are not "trapped" laterally by other colored numbered balls which results in removal of the selected pairs from the playing area (i.e., a simplified version of Taipei or Mah-Jongg). The ultimate goal is to remove all of the colored/numbered balls from the playing area. However, not every deal of the gamepieces (colored/numbered balls) will result in a game that can be won by the rules of the game. Sometimes, even if the player makes all of the best moves, all of the colored/numbered balls can still not be removed. Therefore, the prize awarding system is used to determine the highest point score that could be achieved for removing the most colored/numbered balls from the playing area in order to determine a number of points required to win a jackpot even though the player did not technically "win" the game based upon the matching game rules.

The electronic games may include sporting games or action games which have a controllable number of play scenarios PS1-PSn. For example, in a game of electronic golf, for a particular drive, the player can choose from a number of different clubs, choose a number of swing or stroke lengths, and a speed of the club. All of these factors can be used to determine an optimum score for that particular play scenario PS1-PSn given all of the available choices. In this case, the player is trying to achieve the lowest golf score for each hole. Alternatively, the player may be trying to achieve high point scores based upon length of drive, length of put or speed of play.

Similarly, in an electronic football game, a player can choose the number of receivers on the field, a particular play pattern to run and the speed and direction in which to throw the ball. All of these factors can be used to determine an optimum score for that particular play scenario PS1-PSn given all of the available choices.

Likewise in other action games, such as adventure games or race games, where determinable play factors may prevent a particular play scenario PS1-PSn from ultimately being winnable by the rules of the game, a simulation can be run in accordance with the present invention to determine an optimal score for a particular play scenario PS1-PSn.

Thus, the electronic games need not be limited to card games, trivia games and board games, but may also include action games, adventure games, sporting games and the like.

It should be noted that the amusement device 26 may also include one or more electronic games that do not award prizes, but which are for entertainment play only. Additionally, the amusement device 26 may also include other functionality and features such as video-jukebox, multimedia player, Internet browsing, broadcast media viewing, time-based rental mode, non-prize tournaments, prize-based tournaments, head-to-head competition, prize-based lotteries, ticket dispensing, prize dispensing, debit/credit card charging, phone-card dispensing, e-mail, photography and the like.

The amusement device 26 may also provide for remote or local access for accounting and/or bookkeeping purposes. The amusement device 26 may include local meters (hardware or software) for counting currency-in, currency-out, credit-in, credit-out, number of plays, particular game statistics, maintenance, door access, number of wins overall, number of jackpots paid out, number of each prize paid out and the like. The amusement device 26 may include a local connector for uploading to a handheld or portable computer or a removable memory for such accounting/bookkeeping data. The amusement device 26 may also include accounting and bookkeeping screens accessible by the operator through the setup screens and/or through password protection.

From the foregoing it can be seen that the present invention comprises an amusement device having a prize awarding system and methods for playing such an amusement device with prize awarding system. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An amusement device that awards prizes, the amusement device having a display and an input device, the amusement device comprising:

a memory that stores at least one electronic game and a system control program, the at least one electronic game has a plurality of play scenarios and is at least partially skill-based; and a controller operatively coupled to the memory, the input device and the display, the controller controlling the display based upon the system control program retrieved from the memory and based upon inputs from the input device, the controller being configured to:

(i) permit the user to selectively retrieve from the memory and play the at least one electronic game;

(ii) generate, for play by the user, a particular play scenario selected from a plurality of play scenarios;

(iii) prior to play of the particular play scenario by the user, determine, for the particular play scenario, at least one of an optimum series of requisite moves and a best achievable score, performance of the at least one of the optimum series of requisite moves by the user resulting in attainment of the best achievable score for the particular play scenario;

(iv) determine a current payout percentage of the amusement device;

(v) setting, prior to the play of the at least one electronic game, a first minimum winning score as a percentage of the best achievable score or by adding or subtracting an offset from the best achievable score for the particular play scenario, the percentage or the offset being calculated based on a difference between the current payout percentage and a predetermined payout percentage for the amusement device; and (vi) permit award of a particular prize to the user based on attainment by the user of a score for the particular play scenario between the first minimum winning score and the best achievable score.

2. The amusement device of claim 1, wherein a game simulation software tool running a plurality of simulations of different possible moves based on the particular play scenario is stored in the memory and executed by the controller to determine the at least one of the optimum series of requisite moves for the particular play scenario as the particular play scenario is generated by the controller.

3. The amusement device of claim 2, wherein the at least one of the optimum series of requisite moves for the particular play scenario are translated into a total number of points/credits associated with making the requisite moves based on rules of the at least one electronic game.

4. The amusement device of claim 1, wherein a game simulation software tool running a plurality of simulations of different possible moves based on the particular play scenario is used in a computer to generate one of a lookup table and a database of the at least one of the optimum series of requisite moves for each particular play scenario or the best achievable score for each particular play scenario, the database or lookup table being stored in the memory and accessed by the controller to determine the at least one of the optimum series of requisite moves for the particular play scenario as the particular play scenario is generated by the computer.

5. The amusement device of claim 4, wherein the at least one of the optimum series of requisite moves for each of the plurality of play scenarios are translated into a total number of points/credits associated with making the requisite moves based on rules of the at least one electronic game.

6. The amusement device of claim 1, wherein the amusement device includes an operating mode and a setup mode, when the operating mode is selected, a user is selectively permitted to play games, and when the setup mode is selected, an operator is permitted to make system setup adjustments.

7. The amusement device of claim 6, wherein when the setup mode is selected, an operator is permitted to make adjustments to the first minimum winning score level.

8. The amusement device of claim 6, wherein when the setup mode is selected, an operator is permitted to make adjustments to a second minimum winning score level, the second minimum winning score level providing a threshold for awarding a jackpot award to the user.

9. The amusement device of claim 6, wherein when the setup mode is selected, an operator is permitted to make adjustments to the predetermined payout percentage.

10. The amusement device of claim 1, wherein the at least one electronic game is one of a card game and a strategy game.

11. The amusement device of claim 1, wherein the at least one electronic game is one of solitaire, blackjack, poker, bridge, rummy, war, memory, matching, MahJongg, backgammon, chess, checkers and tic-tac-toe.

12. The amusement device of claim 1, wherein the input device is one of a pushbutton, a touchscreen, a touchpad, a trackball, a mouse, a joystick, a foot-pedal, a voice-recognition system, a keypad and a keyboard.

13. The amusement device of claim 1, wherein the amusement device is configured to award a plurality of different prizes for each game play based upon a plurality of calculations using one of the determined moves and the determined best achievable score.

14. An amusement device that awards prizes, the amusement device having a display and an input device, the amusement device comprising:

a memory that stores plurality of electronic games and a system control program, each of the plurality of electronic games has a plurality of play scenarios and is at least partially skill-based; and a controller operatively coupled to the memory, the input device and the display, the controller controlling the display based upon the system control program retrieved from the memory and based upon inputs from the input device, the controller being configured to:

(i) permit the user to selectively retrieve from the memory and play one of the plurality of electronic games;

(ii) generate, for play by the user, a particular play scenario selected from a plurality of play scenarios;

(iii) prior to play of the particular play scenario by the user, determine at least one of an optimum series of requisite moves and a best achievable score, performance of the at least one of the optimum series of requisite moves by the user resulting in attainment of the best achievable score for the particular play scenario;

(iv) set, as a percentage of the best achievable score or by adding or subtracting an offset from the best achievable score, a minimum score necessary to win at least one of a minimum prize/minimum payout and a jackpot, the percentage or the offset being calculated based on a difference between a current payout percentage of the amusement device and a predetermined payout percentage of the amusement device; and (v) permit award of the at least one of the minimum prize and the jackpot to the user based on attainment by the user of a score for the particular play scenario between the minimum score and the best achievable score.

15. A method of playing an amusement device having a display, an input device, a memory that stores at least one electronic game and a system control program, and a controller operatively coupled to the memory, the input device and the display, the controller controlling the display based upon the system control program retrieved from the memory and based upon inputs from the input device, the method comprising:

selectively retrieving from the memory the at least one electronic game, the at least one electronic game has a plurality of play scenarios and is at least partially skill-based;

permitting a user to selectively play the at least one electronic game;

generating, for play by the user, a particular play scenario selected from the plurality of play scenarios;

prior to play of the particular play scenario by the user, determining, in the controller, at least one of an optimum series of requisite moves and a best achievable score, performance of the at least one of the optimum series of requisite moves by the user resulting in attainment of the best achievable score for the particular play scenario;

determining a current payout percentage of the amusement device;

setting, prior to the play of the at least one electronic game, a minimum winning score as a percentage of the best achievable score or by adding or subtracting from to the best achievable score for the particular play scenario, the percentage or offset being calculated based on a difference between the current payout percentage and a predetermined payout percentage for the amusement device; and permitting award of a particular prize to the user based on attainment by the user of a score for the particular play scenario between the minimum winning score and the best achievable score.

16. The method according to claim 15, further comprising: displaying on the display the determined minimum score necessary to win one of a minimum prize and minimum payout.

17. The method according to claim 15, further comprising: determining, in the controller, a plurality of minimum scores necessary to win each of a plurality of respective prizes/payouts.

* * * * *